(12) United States Patent
Layman et al.

(10) Patent No.: US 8,426,521 B2
(45) Date of Patent: Apr. 23, 2013

(54) POLYMER COMPOSITION

(75) Inventors: John Moncrief Layman, Liberty Township, OH (US); Andrew Eric Neltner, Loveland, OH (US); Emily Charlotte Boswell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/186,932

(22) Filed: Jul. 20, 2011

(65) Prior Publication Data
US 2013/0023627 A1 Jan. 24, 2013

(51) Int. Cl.
*C08F 8/00* (2006.01)
*C08L 23/10* (2006.01)
*C08L 23/04* (2006.01)

(52) U.S. Cl.
USPC .......................................... 525/191; 525/240

(58) Field of Classification Search .................. 525/191, 525/240
See application file for complete search history.

(56) References Cited

U.S. PATENT DOCUMENTS

| 7,893,161 B2 * | 2/2011 | Chang et al. .................. 525/191 |
| 2003/0022952 A1 | 1/2003 | Kim |
| 2005/0127579 A1 | 6/2005 | Suzuki |

* cited by examiner

*Primary Examiner* — Nathan M Nutter
(74) *Attorney, Agent, or Firm* — Brent M. Peebles

(57) ABSTRACT

Disclosed herein is a composition substantially free of polyethylene, wherein the composition includes a thermoplastic material having certain specified mechanical properties, and about 2 wt. % to about 25 wt. % (based on the total weight of the composition) of an olefin mixture that consists essentially of a 30:70 to 70:30 weight ratio of a homogeneous ethylene-alpha olefin interpolymer and a propylene-based elastomer having at least 75 wt. % units derived from propylene and about 10 wt. % to about 25 wt. % units derived from a $C_2$ or a $C_{4-10}$ alpha olefin. The specified olefin mixture unexpectedly imparts to the overall composition mechanical properties (such as impact strength, for example) heretofore unattainable. These mechanical properties can be expected to be tailored to suit the end-use expected of the composition.

18 Claims, 1 Drawing Sheet

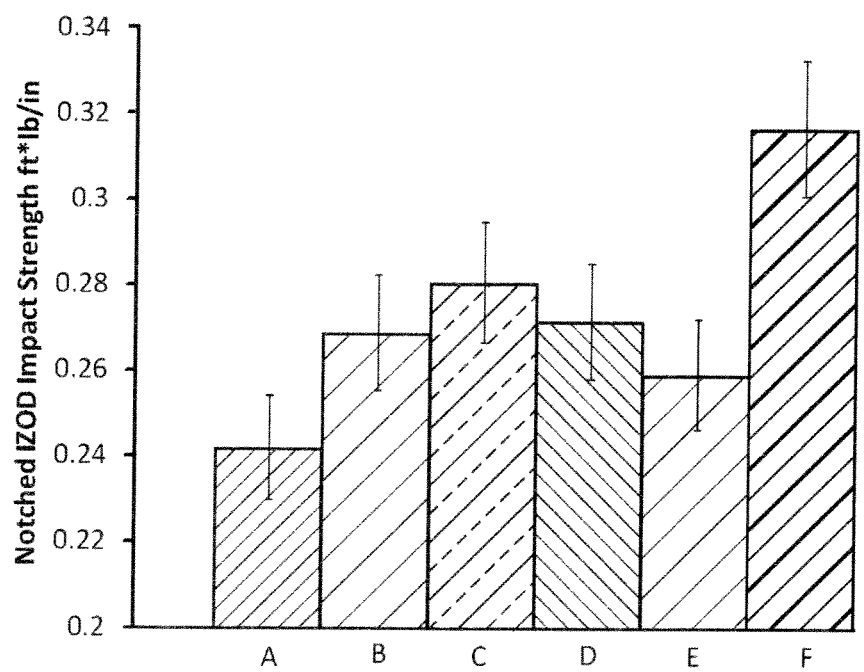

POLYMER COMPOSITION

FIELD OF THE INVENTION

The disclosure generally relates to compositions suitable for injection molding and, more specifically, to compositions of recycled polymers wherein the compositions have impact strength and other properties that are suitable for injection molding and are improved relative to that of the recycled polymers alone.

BACKGROUND OF THE INVENTION

A substantial share of manufactured polymers are used as packaging for consumer products, such as personal care product packages (e.g., shampoo, conditioner, and soap bottles) and fabric and household care product packages (e.g., for laundry detergent and cleaning compositions). Most of the materials used to produce polymers for plastic packaging applications, such as polyethylene, polyethylene terephthalate, and polypropylene, are derived from monomers (e.g., ethylene, propylene, terephthalic acid, ethylene glycol). These monomers are typically obtained from non-renewable, fossil-based resources, such as petroleum, natural gas, and coal. The price and availability of these resources significantly influence the price of polymers used for plastic packaging. As the availability of these resources diminishes, monomer prices increase, and so too does the price of products (e.g. polymers) made from these resources. There is therefore a continuing need to recycle these polymers for use or re-use in these same applications. Heretofore, however, the art has encountered difficulties in processing recycled plastics for further use in injection molding.

Bertrin et al. (2002) *Euro Polym Jnl* 38:2255-64 suggested the use of various compatibilizing agents where the recycled materials are blends of low density polyethylene and polypropylene. For example, the impact strength of these blends have been improved with the addition of compatibilizing agents, such as ethylene diene monomers, ethylene propylene monomers, or PE-g-(2-methy)-1,3-butadiene) graft copolymers.

In a patent application filed in 2003, Suzuki described a process for injection molding a composition that includes recycled thermoplastic resin and one recycle aid agent that tempers or prevents degradation of the mechanical properties of the recycled resin. See U.S. patent publication No. 2005/0127579 A1. The recycled resin includes, among others, olefin resins such as polyethylene, polypropylene, and copolymers of ethylene and propylene. The recycle aid agent includes, among others, rubber-like materials that include an olefin group rubber as a "trunk" portion of the material and, as a branch part of the material, a graft chain compatible with the recycled resin. The olefin group rubber can be a copolymer of ethylene and an α-olefin, such as ethylene-propylene copolymer rubber (EPM), ethylene-propylene-non-conjugated diene compound terpolymer (EPDM), ethylene-butene copolymer rubber (EBM), and ethylene-butene-non-conjugated diene compound terpolymer (EBDM). Whatever the recycle agent, Suzuki teaches that it may be added to the plastic resin in an amount of about 1 weight percent (wt. %) to about 10 wt. %, and the resulting mixture then injection molded. Furthermore, Suzuki teaches the need to combine recycling aids with more complex and more expensive gas assist and expansion injection molding methods to achieve any improvements in mechanical properties.

In 2005, Chang et al. described a combination of a propylene-based elastomer and a homogeneous ethylene-alpha olefin interpolymer, present in a weight ratio of 97:3 to 80:20, that can be used with another propylene-based polymer (such as homopolymer polypropylene, random copolymer polypropylene, and/or impact copolymer) to improve physical properties of the polymer. See U.S. Pat. No. 7,893,161 B2.

In 2008, Brachet et al. recognized the difficulty in maintaining a constant quality of recycled materials and that up to 10% of foreign materials can be found in recycled polypropylene even if well sorted. They posited that the mechanical properties of recycled polypropylene from post-consumer containers could be improved with the addition of calcium carbonate and ethylene-octene rubber (such as ENGAGE 801 available from the Dow Chemical Company (Midland, Mich.), which is a copolymer of the alpha-olefin octane and ethylene). But they reported that the results of their tests did not show an improvement because of the presence of a crystalline fraction of polyethylene that contaminated the recycled polypropylene.

SUMMARY OF THE INVENTION

Disclosed herein is a composition substantially free of polyethylene, wherein the composition includes a thermoplastic material having certain specified mechanical properties, and about 2 wt. % to about 25 wt. % (based on the total weight of the composition) of an olefin mixture that consists essentially of a 30:70 to 70:30 weight ratio of a homogeneous ethylene-alpha olefin interpolymer and a propylene-based elastomer having at least 75 wt. % units derived from propylene and about 10 wt. % to about 25 wt. % units derived from a $C_2$ or a $C_{4-10}$ alpha olefin. The thermoplastic polymer has the following mechanical properties: a notched IZOD impact strength of about 0.095 foot-pounds per inch (ft·lbs/in) to about 0.400 ft·lbs/in, a tensile modulus of about 795 megapascals (MPa) to about 2520 MPa, a strain at yield of about 5% to about 12%, a stress at yield of about 35 MPa to about 50 MPa, and a melt flow rate index of about 8 grams per 10 minutes (g/10 min) to about 20 g/10 min. The specified olefin mixture unexpectedly imparts to the overall composition mechanical properties (such as impact strength, for example) heretofore unattainable and unexpectedly improved relative to the thermoplastic material alone. These mechanical properties can be expected to be tailored to suit the end-use expected of the composition.

Preferably, the olefin mixture exhibits a heat of fusion from about 2 Joules/gram (J/g) to about 55 J/g, and a 2% secant flexural modulus of less than 69 MPa. And, as part of that mixture, the propylene based elastomer preferably exhibits a heat of fusion by Differential Scanning calorimetry (DSC) analysis of about 1 J/g to about 35 J/g, a weight average molecular (Mw) of about 54,000 g/mol to about 875,000 g/mol, and a permanent set of less than 40%. Preferably, the propylene-based elastomer is a copolymer of ethylene and propylene.

As part of the olefin mixture, the homogeneous ethylene-alpha olefin interpolymer preferably is selected from a substantially linear polyethylene and a homogeneously branched linear polyethylene having a molecular weight distribution (Mw/Mn) of less than 3.5, a density of about 0.885 g/ml to about 0.915 g/ml, and a heat of fusion of from about 65 J/g to about 125 J/g. Preferably, the homogeneous ethylene-alpha olefin interpolymer is a copolymer of ethylene and hexene. Preferably, the weight ratio of the propylene-based elastomer to the homogeneous ethylene-alpha olefin interpolymer is about 40:60 to about 60:40, and more preferably the ratio is about 50:50.

Additional features of the invention may become apparent to those skilled in the art from a review of the following detailed description, taken in conjunction with the drawing FIGURE, the examples, and the appended claims.

BRIEF DESCRIPTION OF THE DRAWING

For a more complete understanding of the disclosure, reference should be made to the following detailed description and accompanying drawing wherein the sole FIGURE graphically illustrates the impact strength (Notched IZOD) achievable with various formulations and the unexpectedly high impact strength achievable with at least one particular formulation.

While the disclosed composition is susceptible of embodiments in various forms, there are illustrated in the drawing (and will hereafter be described) a specific embodiment of the composition, with the understanding that the disclosure is intended to be illustrative, and is not intended to limit the invention to the specific embodiments described and illustrated herein.

DETAILED DESCRIPTION OF THE INVENTION

It has unexpectedly been discovered that mechanical properties of injection molded articles made from certain compositions containing recycled thermoplastics, for example, can be dramatically enhanced by the inclusion in the compositions of an olefin mixture consisting essentially of a propylene-based elastomer and a homogeneous ethylene-alpha olefin interpolymer. As explained in more detail below, that discovery has further lead to an appreciation that such thermoplastic compositions can be engineered and designed to provide mechanical properties suited to satisfy the mechanical demands accompanying the expected end use of the compositions following injection molding. Specifically, and as described in more detail below, the enhancement has been observed in thermoplastic polymers having a notched IZOD impact strength of about 0.095 foot-pounds per inch (ft·lbs/in) to about 0.400 ft·lbs/in, a tensile modulus of about 795 megapascals (MPa) to about 2520 MPa, a strain at yield of about 5% to about 12%, a stress at yield of about 35 MPa to about 50 MPa, and a melt flow rate index of about 8 grams per 10 minutes (g/10 min) to about 20 g/10 min. More specifically, the enhancement has been observed when these polymers are combined with about 2 weight percent (wt. %) to about 25 wt. %, based on the total weight of the composition, of an olefin mixture of the propylene-based elastomer and the homogeneous ethylene-alpha olefin interpolymer. The propylene-based elastomer has at least 75 wt. % units derived from propylene and about 10 wt. % to about 25 wt. % units derived from a $C_2$, or a $C_{4-10}$ alpha olefin. It is believed that the weight ratio of the propylene-based elastomer to the homogeneous ethylene-alpha olefin interpolymer should be about 30:70 to about 70:30, and in one embodiment is about 50:50.

As described in further detail below, the composition includes a thermoplastic polymer having certain specific properties. The composition is substantially free of polyethylene (including low density, linear low density, and high density polyethylenes). Furthermore, the composition is preferably also substantially free of polystyrene, polyethylene terephthalate, styrene acrylonitrile, acrylonitrile butadiene styrene, polycarbonate, polyvinyl chloride, and other polymeric contaminants that do not possess the specific properties described below. Accordingly, in this context, the term "substantially free" is intended to mean that the composition is free of polymeric contaminants, such as, polyethylene, that do not possess the specific properties described below. While not wishing to be bound by any particular theory, it is believed that such contaminants compromise the ability to achieve a composition having the unexpectedly high impact strength properties recognized herein. Thus, preferably, the composition contains 2 wt. % or less of polyethylene, more preferably less that 1.5 wt. %, even more preferably less than 1 wt. %, based on the total weight of the composition. Similarly, the composition preferably contains 2 wt. % or less of polystyrene, polyethylene terephthalate, styrene acrylonitrile, acrylonitrile butadiene styrene, polycarbonate, and polyvinyl chloride, based on the total weight of the composition, and more preferably less that 1.5 wt. %, even more preferably less than 1 wt. % of these materials, based on the total weight of the composition.

Thermoplastic Polymer

The thermoplastic polymer has a notched IZOD impact strength of about 0.095 ft·lbs/in to about 0.400 ft·lbs/in, preferably about 0.125 ft·lbs/in to about 0.350 ft·lbs/in, and more preferably about 0.150 ft·lbs/in to about 0.275 ft·lbs/in. The notched IZOD impact strength is determined by ASTM D256, using notched rectangular specimens 3 mm wide that were annealed for at least 72 hours at room temperature (about 23° C.) prior to testing. The thermoplastic polymer has a tensile modulus of about 795 MPa to about 2520 MPa, preferably about 1230 MPa to about 2090 MPa, and more preferably about 1370 MPa to about 1960 MPa. The thermoplastic polymer has a strain at yield of about 5% to about 12%, preferably about 6% to about 10%, and more preferably about 7% to about 9%. The thermoplastic polymer has a stress at yield of about 35 MPa to about 50 MPa, preferably about 38 MPa to about 47 MPa, and more preferably about 40 MPa to about 45 MPa. The tensile modulus, the strain at yield, and the stress at yield are all determined by ASTM D638, using an ASTM Type V (0.062 inch thick by 0.125 inch wide by 2.50 inch long) test specimen. The thermoplastic polymer has a melt flow rate index of 8 g/10 mins to about 20 g/10 mins. preferably about 10 g/10 mins to about 18 g/10 mins, and more preferably about 12 u/l0 ruins to about 16 g/10 mins. The melt flow rate index is determined by ASTM D1238 (Condition 230° C., 2.16 kg weight).

Preferably, the thermoplastic polymer is present in the composition in an amount of up to about 96 wt. %, based on the total weight of the composition. According to an embodiment of the invention, the thermoplastic polymer is present in the composition in an amount of about 73 wt. % to about 96 wt. %, based on the total weight of the composition. According to other embodiments of the invention, the thermoplastic polymer is present in the composition in an amount (based on the total weight of the composition) of about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, or about 96 wt. %.

A suitable source for such a thermoplastic polymer is a recycled/reprocessed polypropylene available from Nextlife Recycling, L.L.C. with the grade designation of "PP Natural Pellets."

Olefin Mixture

The composition also includes an olefin mixture present in the composition in an amount of about 2 wt. % to about 25 wt. %, preferably about 5 wt. % to about 15 wt. %, and more preferably about 8 wt. % to about 12 wt. %, based on the total weight of the composition. As explained in more detail below, the olefin mixture consists essentially of a homogeneous ethylene-alpha olefin interpolymer and a propylene-based elastomer. The interpolymer and elastomer are generally disclosed in U.S. Pat. No. 7,893,161 B2, but are neither disclosed nor taught therein in the proportions or in combination with certain thermoplastics (e.g., recycled thermoplastics) now specified in this application. A discovery, therefore, is that the interpolymer and elastomer, when combined in the specified proportions with the thermoplastic, impart to the resulting composition unexpected mechanical properties that are not otherwise attainable outside of the specified proportions of the interpolymer and elastomer.

Homogeneous Ethylene-Alpha Olefin Interpolymer

The homogeneous ethylene-alpha olefin interpolymer preferably is an interpolymer of units derived from ethylene and a $C_{4-8}$ alpha-olefin comonomer. The preferred alpha-olefin comonomers are $C_{4-12}$ alpha-olefins, more preferably $C_{4-8}$ alpha-olefins and 4-methyl-1-pentene, further more preferably $C_4$, $C_6$, and $C_8$ alpha-olefins, and most preferably 1-hexene. The homogeneous ethylene-alpha olefin interpolymer includes from about 91 to about 97 mole percent units derived from ethylene with the remainder including an alpha olefin. The homogeneous ethylene-alpha olefin interpolymers are selected from substantially linear polyethylene polymers and homogeneous branched linear polyethylene (both as more fully described below). The homogeneous ethylene-alpha olefin interpolymers can be made using known manufacturing processes, such as gas phase, solution, or slurry polymer manufacturing processes. Examples of homogeneous ethylene-alpha olefin interpolymers useful in the invention are ethylene/1-octene and ethylene/1-hexene substantially linear polyethylene available from The Dow Chemical Company (Midland, Mich.) under the trademarks "AFFINITY" and "ENGAGE," homogeneous branched linear polyethylene available from ExxonMobil Chemical (Baytown, Tex.) and DEXPlastomers (DSM/ExxonMobil Chemical) under the trademarks "EXACT" and "EXCEED," ethylene-alpha-olefin interpolymers available from Innovene (subsidiary of BP Group) under the trademark "INNOVEX," ethylene-alpha olefin copolymers available from Basell under the trademarks "LUPOLEX" and "LUFLEXEN," and ethylene-alpha olefin copolymers available from Mitsui Chemicals under the trademarks "TAFMER."

A polyethylene is any polymer that includes greater than seventy mole percent ethylene ($-CH_2CH_2-$) repeating units derived from an ethylene monomer. Interpolymers include copolymers, terpolymers, tetrapolymers, and higher order polymers of ethylene and $C_{4-20}$ olefins. "Substantially linear polyethylene" is polyethylene as described in U.S. Pat. Nos. 5,272,236 and 5,278,272.

"Homogeneously branched linear polyethylenes" are polyethylenes having a CDBI greater than 50% as calculated in accordance with International Publication No. WO1993/004486(A)) using the equipment and procedures as described in U.S. Pat. No. 5,008,204, such as polyethylenes commercially available under the trademarks "EXCEED" and "EXACT".

The melt index ("MI") of the homogeneous ethylene-alpha olefin interpolymer is about 0.1 g/10 min to about 1500 g/10 min, more preferably about 0.3 g/10 min to about 20 g/10 min, further more preferably about 0.5 g/10 min to about 15 g/10 min, most preferably about 1 g/10 min to about 10 g/10 min. The melt index measurement is performed according to ASTM D-1238 (conditions 190° C., 2.16 kilogram (kg) weight, formerly known as "Condition E" and also known as MI or $I_2$). The melt index is inversely proportional to the molecular weight of the polymer. Thus, higher molecular weight correlates with lower melt index, although the relationship is not linear. Those ordinarily skilled in the art will appreciate that the favored melt index can vary depending on the end-use applications for which the composition is utilized. For example, the preferred melt index of the ethylene-alpha olefin interpolymer preferably is about 0.1 g/10 min to about 3 grams/10 minutes for blown film applications; about 2 g/10 min to about 25 g/10 min for cast film applications; about 5 g/10 min to about 25 g/10 min for spunbond nonwoven and/or staple fiber applications; about 2 g/10 min to about 20 g/10 min for extrusion coating; about 10 g/10 min to about 600 g/10 min for melt blown nonwoven applications; about 10 g/10 min to about 1000 g/10 min for hot melt adhesive applications; about 1 g/10 min to about 200 g/10 min for injection molding applications. Further, those ordinarily skilled in the art will also appreciate that resins with a melt index greater than about 500 g/10 min may be correlated with Brookfield Viscosity at 350° F. (177° C.) as described in Table One of U.S. Pat. No. 6,054,544. Thus, for example a polyethylene with a melt index of about 1000 g/10 min will have a Brookfield Viscosity of about 8200 centipoise (cps). Further, a polyethylene with a melt index of about 500 g/10 min will have a Brookfield Viscosity of about 17000 cps.

The density of the homogeneous ethylene-alpha olefin interpolymers is about 0.885 grams per milliliter (g/mL) to about 0.915 g/mL, preferably about 0.890 g/mL to about 0.910 g/mL, more preferably about 0.895 g/mL to about 0.905 g/mL, and most preferably about 0.897 g/mL to about 0.903 g/mL (measured on compression molded samples at 190° C. according to ASTM D4703-00 and cooled using procedure B) using the procedure of ASTM D792 to determine the density. The homogeneous ethylene-alpha olefin interpolymers preferably have a crystallinity of about 27 wt. % to about 42 wt. %. For ethylene 1-octene interpolymers, this crystallinity corresponds to about 14 wt. % to about 25 wt. % polymeric units derived from 1-octene. For ethylene 1-hexene interpolymers, this crystallinity corresponds to about 12 wt. % to about 20 wt. % polymeric units derived from 1-hexene. For ethylene 1-butene interpolymers, this crystallinity corresponds to about 8.5 wt. % to about 18.3 wt. % polymeric units derived from 1-butene. The crystallinity can be determined from the heat of fusion by using the relationship that polyethylene having 100 wt. % crystallinity has a heat of fusion of about 290 J/g. With this relationship, the total crystallinity of an ethylene-alpha olefin interpolymer (units: weight % crystallinity) is calculated as the heat of fusion divided by 290 J/g and multiplied 100.

The homogeneous ethylene-alpha olefin interpolymer exhibits a heat of fusion of about 40 J/g to about 115 J/g, preferably about 45 J/g to about 100 J/g, more preferably about 50 J/g to about 85 J/g, and most preferably about 56 J/g to about 66 J/g.

The homogeneous ethylene-alpha olefin interpolymer exhibits a peak crystallization temperature of about 64° C. to about 94' C., preferably about 68° C. to about 90° C., more preferably about 73° C. to about 81° C., and most preferably about 74° C. to about 80° C. The homogeneous ethylene-alpha olefin interpolymer exhibits a peak melting temperature of about 78° C. to about 110° C. preferably about 84° C. to about 105° C., more preferably about 90° C. to about 101° C., and most preferably about 92° C. to about 99° C.

The homogeneous ethylene-alpha olefin interpolymer exhibits a flexural modulus (2% secant, by ASTM D790) for compression molded samples using the previously described condition of about 27 MPa to about 131 MPa; preferably about 35 MPa to about 101 MPa; more preferably about 45 MPa to about 78 MPa and most preferably about 51 MPa to about 70 MPa.

The resin requirements reflect the need for the homogeneous ethylene-alpha olefin to nucleate the propylene-based elastomer which facilitates crystallization of the propylene-based polymer.

Preferably, the homogeneous ethylene-alpha olefin interpolymer is a copolymer of ethylene and hexene, such as one commercially available from, for example, ExxonMobil Chemical under the tradename Exact™ 3131.

Propylene-Based Elastomer

The propylene-based elastomer includes at least 75 wt. % units derived from propylene (preferably at least 82 wt. %, more preferably at least 83 wt. %, further more preferably at least 84 wt. %); and about 10 wt. % to about 25 wt. % units derived from an alpha olefin selected from ethylene and $C_{4-20}$ alpha-olefins (preferably, about 10 wt. % to about 18 wt. %, more preferably about 11 wt. % to about 17 wt. %, and most preferably about 12 wt. % to about 16 wt. %) of the propylene-alpha olefin copolymer. Preferably, the alpha olefin comprises $C_2$, and $C_{4-10}$ alpha-olefins, more preferably $C_2$, $C_4$, $C_6$ and $C_8$ alpha-olefins, further more preferably ethylene and 1-butene, and most preferably ethylene.

The propylene-based elastomer is elastic (as described below), has a molecular weight distribution (Mw/Mn) of less than 3.5 (preferably less than 3.0), and exhibits a heat of fusion (ΔH) by Differential Scanning calorimetry (DSC) of about 1 J/g to about 35 J/g, preferably about 2 J/g to about 25 J/g, more preferably about 2 J/g to about 15 J/g, further more preferably about 2 J/g to about 12 J/g, and most preferably about 2 J/g to about 6 J/g.

For samples which have a heat of fusion of less than 2 J/g for the method described elsewhere in this document, an additional DSC procedure is applied to determine the DSC properties: (1) hold samples at 210° C. for 3 minutes; (2) cool at 10° C./min until 23° C.; (3) remove from DSC and store sample at ambient conditions (23°±2° C. and 50±5% relative humidity) for 48 hours; (4) the sample is inserted into the DSC and cooled at a rate of 10° C./min to −40° C. and kept isothermally at that temperature for 3 minutes; (5) then, the sample is heated at a rate of 10° C./min until complete melting. The heat of fusion is determined from the thermogram from step (5) as described in International Publication No. WO2003/040201. For this procedure, the heat of fusion is preferably about 2 J/g to about 12 J/g, and most preferably about 2 J/g to about 6 J/g.

The weight-average molecular weight (Mw) of the propylene-based elastomer is from at least from about 54,000 g/mol to about 875,000 g/mol, preferably from about 69,000 g/mol to about 440,000 g/mol, more preferably from about 111,000 g/mol to about 390,000 g/mol, and most preferably about 165,000 g/mol to about 360,000 g/mol.

For purposes of this invention, a polymer or polymer composition is considered to exhibit "elastic" behavior (i.e., is an "elastomer") if the polymer or polymer composition conforms to the following description: (1) ASTM D1708 microtensile samples are cut from a compression molded plaque (see subsequent description); (2) using an Instron Electromechanical Materials Testing Machine (Model 5564, from Instron Corporation, (Norwood, Mass.)) fitted with pneumatic grips and a 100 N load cell, the sample is deformed to 100% strain at 500%/min (111.25 mm/min) from an initial gauge length of 22.25 mm at 23°+2° C. and 50+5% relative humidity; (3) the grips are returned to the original position and then immediately extended until the onset of a positive tensile stress (0.05 MPa) is measured; (4) the strain corresponding to this point is defined to be the permanent set; and, (5) samples which exhibit a permanent set of less than or equal to 40% strain are defined as elastic.

Exemplary propylene-based elastomers useful in the invention include propylene-alpha-olefin copolymers made using metallocene catalysts in the solution process, such as propylene-ethylene copolymers available from ExxonMobil Chemical under the "VISTAMAXX" trademark, propylene-butene copolymers available from Mitsui Chemicals under the "TAFMER" trademark, and propylene-alpha olefins copolymers manufactured using a nonmetallocene, metal-centered, heteroaryl ligand catalyst, such as described in International Publication No. WO2003/040201 A1.

Examples of a non-metallocene, metal-centered, ligand catalyst that may be utilized to manufacture a propylene-based elastomer useful in the invention are the catalysis described in U.S. Pat. Nos. 6,897,276; 6,869,904; and 6,841,502, which are incorporated by reference in their entirety for their teachings regarding such catalysts. These catalysts are referred to herein as non-metallocene, metal-centered, substituted aryl ligand catalysts.

The propylene-based elastomers preferably are manufactured with a metallocene catalyst, a non-metallocene, metal-centered, heteroaryl ligand catalyst, a non-metallocene, metal centered, substituted aryl catalyst, or a mixture thereof. Preferably, the catalyst utilized is a non-metallocene, metal centered, heteroaryl ligand catalyst or a non-metallocene, metal centered, substituted aryl catalyst which can both be described by the following general formula, optionally with an activating cocatalyst: MLn, wherein M is a metal selected from Groups 3 to 6 and the lanthanoids (elements 57 to 71) as designated by the IUPAC Periodic Table (version 3 October 2005); L is a ligand bonded to the transition metal through at least one atom that is C, O, N, P, F, Cl, Br, I, or S, and L is not a pi-bonded charge-delocalized substituted or unsubstituted cyclopentadienyl ligand, and at least one of L is a substituted aryl or heteroaryl ligand; and, n is an integer.

Where broad crystallinity distribution propylene-based elastomers are desired, the use of a non-metallocene, metal centered, heteroaryl ligand catalyst is most preferably utilized to manufacture the elastomer.

The propylene-based elastomer typically has a melt flow rate (according to ASTM D-1238, Condition 230° C. 2.16 kg weight) of about 0.1 g/10 min to about 1150 g/10 min. preferably about 1 g/10 min to about 500 g/10 min, more preferably about 1.5 g/10 min to about 100 g/10 min, and most preferably about 2 g/10 min to about 30 g/10 min.

As with the melt flow index, the melt flow rate is inversely proportional to the molecular weight of the polymer. Thus, the higher the molecular weight, the lower the melt flow rate, although the relationship is not linear. The melt flow rate of the propylene-alpha olefin to be utilized is dependent on the end-use application it is desirably utilized in. For example, the melt flow rate of the propylene-based elastomer is typically about 0.1 g/10 min to about 10 g/10 min for air-quenched blown films; about 2 g/10 min to about 20 g/10 min for cast film; about 12 g/10 min to about 60 g/10 min for spun-bound non-woven applications; about 100 g/10 min to about 1150 g/10 min for melt-blown non-woven applications. Resins with melt flow rates greater than about 100 g/10 min can be spun. Resins with melt flow rates less than about 100 g/10 can be used in spunbond processes with the addition of chain scission agents such as peroxides, free radical initiators, or agents during the process such as described in U.S. Pat. No. 7,030,196.

The melt flow rate or the propylene-based elastomer is typically from about 0.3 g/10 min to about 500 g/10 min. More specifically, the melt flow rate of the propylene-based elastomer is typically about 2 g/10 min to about 100 g/10 min for injection molding applications; about 0.2 g/10 min to about 5 g/10 min for thermoforming end-use applications; about 0.3 g/10 min to about 10 g/10 min for profile extrusion applications; about 0.2 g/10 min to about 5 g/10 min for blow molding applications; about 0.3 g/10 min to about 10 g/10 min for sheet extrusion applications; and about 2 g/10 min to about 8 g/10 min for biaxially oriented film applications.

The propylene-based elastomer exhibits a flexural modulus (measured as 2% secant according to ASTM D790) for compression molded samples using the previously described condition of about 1 MPa to about 69 MPa, preferably about 2 MPa to about 25.3 MPa, more preferably about 3 MPa to about 15.5 MPa, and most preferably about 4 MPa to about 10 MPa.

The propylene-based elastomers typically have substantially isotactic propylene sequences. "Substantially isotactic propylene sequences" and similar terms mean that the sequences have an isotactic triad (mm) measured by $^{13}C$ NMR of greater than about 0.85, preferably greater than about 0.90, more preferably greater than about 0.92 and most preferably greater than about 0.93. Isotactic triads are well known in the art, and are described in, for example, U.S. Pat. No. 5,504,172 and International Publication No. WO 00/01745 that refer to the isotactic sequence in terms of a triad unit in the copolymer molecular chain determined by $^{13}C$ NMR spectra. NMR spectra may be determined as set forth in U.S. Pat. No. 7,893,161 B2.

Preferably, the propylene-based elastomer is a copolymer of ethylene and propylene, such as one commercially available from, for example, ExxonMobil Chemical (Baytown, Tex.) under the tradename Vistamaxx™ 6202.

The inventive composition has a desirable combination of stiffness (as measured by flexural modulus), toughness (as measured by Notched IZOD), and color properties (as measured by tests employing a colorimeter). This combination of high stiffness, high toughness, and optimal color are particularly desirable for applications including but not limited to durable packaging (e.g., re-usable containers for food and non-food items) and rigid packaging (e.g., single use containers typically sold with prepared or preserved foods contained therein). The particular balance of stiffness-toughness-color finds utility in such applications where high stiffness is required to maintain structural rigidity at minimum thickness, toughness is required to prevent breaks in case of impact at ambient or sub-ambient temperatures, and optimal color is required to signal or otherwise delight the end user of a molded article.

The weight ratio of the propylene-based elastomer to the homogeneous ethylene-alpha olefin interpolymer is about 30:70 to about 70:30, preferably about 40:60 to about 60:40, and more preferably about 50:50.

As noted above, the inventive composition includes the above-described olefin mixture in the composition in an amount of about 2 wt. % to about 25 wt. %, preferably about 5 wt. % to about 15 wt. %, and more preferably about 8 wt. % to about 12 wt. %, based on the total weight of the composition. In various embodiments (depending upon the end-use of the injection molded composition), the olefin mixture may be present in the composition in an amount (based on the total weight of the composition) of about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, or about 25 wt. %.

The amount of the olefin mixture present in the composition within these ranges will depend upon the potential end use expected of the composition. For example, if the composition is intended to be injection molded for use as a closure to hold a shampoo or bodywash, the composition may be expected to include the olefin mixture in an amount of about 25 wt. %, based on the total weight of the composition. In contrast, if the composition is intended to be injection molded for use as a dispensing/pouring spout on a liquid laundry detergent container, the composition may be expected to include the olefin mixture in an amount of less than about 2 wt. %, based on the total weight of the composition. Those skilled in the art will readily appreciate from the teachings set forth herein that a shampoo or bodywash closure may reasonably be expected to be dropped (and, perhaps, repeatedly so) over its lifespan and, therefore, desirably require a high level of impact strength. In contrast, a dispensing/pouring spout for a liquid laundry detergent container may not reasonably be expected to similarly receive the shock of the container being dropped (even if repeatedly so) and, therefore, may not desirably require as high a level of impact strength. Those skilled in the art will be able to readily tailor the composition's impact strength based on the expected end use of the composition.

The term "consisting essentially of" indicates that, in addition to the specified materials, materials that do not affect the basic and novel characteristics of the subject composition optionally may be present. For example, additives that are commonly used with the claimed thermoplastic material (e.g., polypropylene) at levels known by those ordinarily skilled in the art, preferably no more than 3 wt. % of the composition, may be present in the composition. Examples of such additives (to the extent that they do not affect the desired properties of the composition) include fillers, antioxidants, light stabilizers, antiblock and slip agents, plasticizers, processing aids, colorants, and pigments.

EXAMPLES

Six exemplary compositions were made and tested to demonstrate the invention. Composition "A" is a recycled polypropylene material, whereas the remaining compositions (compositions "B," "C," "D," "E," and "F") include not only that recycled polypropylene material, but also at least one of a propylene-based elastomer and a homogeneous ethylene-alpha olefin interpolymer, in varying proportions relative to each other. Composition "F" includes a 50:50 weight ratio of a propylene-based elastomer and a homogeneous ethylene-alpha olefin interpolymer. The sole drawing FIGURE graphically illustrates the Notched IZOD impact strength of the various compositions following injection molding and clearly shows a disproportionately (and unexpectedly) high Notched IZOD impact strength relative to each of the other compositions that include different blends of the same propylene-based elastomer and homogeneous ethylene-alpha olefin interpolymer.

Melt flow rates of plastic pellets were determined according to the principles of ASTM D1238, using a Thermohaake Meltflixer (model No. 10482) melt flow indexer. All experiments were performed at 230° C. using a 2.16 kg weight to produce load.

Differential scanning calorimetry was performed according to the principles of ASTM D3418. Approximately 5-10 mg of sample material was hermetically sealed into Perkin-Elmer Kit No. 0219-0041 aluminum testing pans. The prepared samples were analyzed in a Perkin-Elmer (model No. DSC7) differential scanning calorimeter equipped with a Perkin-Elmer model TAC-7/DX refrigeration unit. Samples were analyzed in temperature scanning mode at a scanning rate of 1-10° C./min.

Blending of the compositions was performed by simple hand-mixing of the appropriate proportions of each component in an adequately sized mixing vessel. The admixture was then fed into the hopper of an injection molding machine as a dry blend.

Injection molding of sample specimens was performed according to the principles of ASTM D3641. Samples were molded on an Engel 60-ton injection molding machine equipped with a surface gated multipurpose ASTM A 528540 mold producing specimens with the following dimensions: disc with a radius 31.25 mm and thickness of 1.0 mm; Type V specimen with thickness of 1.5 mm, gauge of 3.0 mm, and a gauge length of 125.5 mm; rectangular specimen with a thickness of 3.0 mm, width of 12.5 mm, and a length of 125.5 mm. The mold was cooled with a closed-circuit water chiller capable of equilibrating the mold to 65° F. Typical injection molding conditions are specified in Table 1:

TABLE 1

| Barrel Temperature (° F.) | |
|---|---|
| Nozzle | 400 |
| Zone 2 | 400 |
| Zone 3 | 380 |
| Zone 4 | 360 |
| Mold Temperture (° F.) | |
| Moving Side | 65 |
| Stat. Side | 65 |
| Molding Times (seconds) | |
| Injection Hold Time | 5.0 |
| Cooling Time | 20.0 |
| Injection Pressures (psi) | |
| Hold Pressure | 600 |
| Peak Pressure | 900 |
| Injection Parameters | |
| Feed Stroke (inches) | 1.87 |
| Injection Speed (inches/second) | 2.0 |
| Screw Parameters | |
| Speed Profile (%) | 25 |
| Decompression after feed (inches) | 0.50 |
| Stroke cut-off point (inches) | 0.12 |
| Supplementary Settings | |
| Sprue Break? | Yes |

Notched IZOD impact strengths were determined according to the principles of ASTM D256. Compositions were injection molded into rectangular specimens by the method described above. The 3 mm thickness by 12.5 mm width by 125.5 mm length rectangular specimen was trimmed to the final length of 63.5 mm using a band saw. A TMI notch cutter (model No. 22-05-03-001) was used to cut a notch (TMI notch blade (model No. 22-05-01-015-02)) into the width direction of the specimen. The prepared specimens were tested on TMI digital pendulum unit (model No. 43-02-01-0001) at room temperature (about 23° C.).

Flexural moduli were determined according to the principles of ASTM D790. Compositions were injection molded into disc specimens by the method described above. The 1.0 mm thickness by 6.8 mm width by 20.0 mm length rectangular specimens were cut from the injection molded disc methods using the appropriately sized stamping die and an Atom model number SE20C clicker press. The prepared specimens were tested on a TA Instruments' dynamic mechanical-thermal analyzer (model No. Q800) equipped a TA instruments 3-point bending fixture.

Tensile properties were determined according to the principle of ASTM D638. Composition were injection molded into ASTM Type V specimens by the method described above. The prepared specimens were tested on an Instron Electromechanical Materials Testing Machine (model No. 1122) equipped with an Instron 500 N load cell (model No. 61619). A crosshead speed of 0.8 mm/second was used for all experiments.

The following materials were utilized in the examples:

"rPP" is a recycled/reprocessed polypropylene obtained from Nextlife Recycling, L.L.C. with the grade designation of "PP Natural Pellets," which was determined to have the following properties: melt flow rate of 13 g/10 min (by ASTM D1238 230° C., 2.16 kg weight); notched IZOD impact strength of 0.242 ft·lbs/in (by ASTM D256, using rectangular specimens 3 mm wide that were annealed for 72 hours at room temperature (about 23° C.) after molding); flexural modulus of 1260 MPa (by ASTM D790); tensile yield stress of 43 MPa and a tensile yield elongation of 9% (both determined by ASTM D638, using an ASTM Type V (0.062 inch thick by 0.125 inch wide by 2.50 inch long) test specimen).

"EP-rubber" is a propylene-ethylene thermoplastic rubber available from ExxonMobil Chemical with a grade designation of Vistamaxx™ 6202 having an ethylene content of 15 wt % and having the following properties as specified on the material's technical data sheet: melt flow rate of 18.0 grams/10 min (by ASTM D1238), density of 0.861 g/cm$^3$ (by ASTM D1505); shore A hardness of 61 (by ASTM D2240, 15 sec, 23° C.); flexural modulus of 11.0 MPa (by ASTM D790, 1% secant at 23° C.): tensile set of 13% (by ASTM D412, 23° C.); tear strength of 33.0 kN/m (by ASTM D624, 23° C., Die C); and Vicat softening temperature of 48.0° C. (by ASTM D1525).

"EH-copolymer' is a homogeneous ethylene-hexene copolymer available from ExxonMobil Chemical with a grade designation of Exact™ 3131 having the following properties as specified on the material's technical data sheet: melt index of 3.5 grams/10 min (by ExxonMobil Method), density of 0.900 g/cm$^3$ (by ExxonMobil Method), vicat softening temperature of 83.0° C. (by ASTM D1525), peak melting temperature of 94° C. (by ExxonMobil Method), and crystallization peak, $T_c$ of 76° C.

EP-rubber, EH-copolymer and rPP were blended into ternary mixtures. A summary of the blended compositions is shown in Table 2.

TABLE 2

| Composition | RPP (wt. %) | EP-rubber (wt. %) | EH-copolymer (wt. %) |
|---|---|---|---|
| A | 100 | 0 | 0 |
| B | 90 | 0 | 10 |
| C | 90 | 10 | 0 |
| D | 90 | 2 | 8 |
| E | 90 | 8 | 2 |
| F | 90 | 5 | 5 |

A summary of the determined/measured physical properties of the blended compositions is shown in Table 3.

TABLE 3

| Composition | Notched IZOD Impact Strength (ft · lbs/in) | Flexural Modulus (psi) | Tensile Modulus (psi) (n = 5) |
|---|---|---|---|
| A | 0.242 | 1260 | 1530 |
| B | 0.269 | 1110 | 1400 |
| C | 0.281 | 1000 | 1060 |
| D | 0.272 | 1130 | 1440 |
| E | 0.259 | 1050 | 1350 |
| F | 0.317 | 1000 | 1140 |

As shown in Table 3 and the sole FIGURE, composition "F" has an unexpectedly high impact strength compared to the other blend compositions. Also shown in Table 3, composition F unexpectedly improves impact strength whilst maintaining satisfactory stiffness (as measured by flexural modulus) and tensile (as measured by tensile modulus) properties.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition substantially free of polyethylene, the composition comprising:
   (a) a recycled/reprocessed polypropylene having a notched IZOD impact strength of about 0.095 foot-pounds per inch (ft·lbs/in) to about 0.400 ft·lbs/in, a tensile modulus of about 795 megapascals (MPa) to about 2520 MPa, a strain at yield of about 5% to about 12%, a stress at yield of about 35 MPa to about 50 MPa, and a melt flow rate index of 8 grams per 10 minutes (g/10 min.) to about 20 g/10 min.;
   (b) about 2 weight percent (wt. %) to about 25 wt. %, based on the total weight of the composition, of an olefin mixture consisting essentially of:
   (i) a propylene-based elastomer, which is different from said recycled/reprocessed polypropylene, having at least 75 wt. % units derived from propylene and about 10 wt. % to about 25 wt. % units derived from a $C_2$, or a $C_{4-10}$ alpha olefin, and
   (ii) a homogeneous ethylene-alpha olefin interpolymer, wherein the weight ratio of the propylene-based elastomer to the homogeneous ethylene-alpha olefin interpolymer is about 30:70 to about 70:30.

2. The composition of claim 1, the olefin mixture exhibits a heat of fusion about 2 to about 55 joules/gram (J/g), and a 2% secant flexural modulus of less than 69 MPa.

3. The composition of claim L wherein the propylene based elastomer exhibits a heat of fusion by Differential Scanning calorimetry (DSC) analysis of about 1 J/g to about 35 J/g, a weight average molecular (Mw) of about 54,000 g/mol to about 875,000 g/mol, and a permanent set of less than 40%.

4. The composition of claim 1, wherein the homogeneous ethylene-alpha olefin interpolymer is selected from a substantially linear polyethylene and a homogeneously branched linear polyethylene having a molecular weight distribution (Mw/Mn) of less than 3.5, a density of about 0.885 g/ml to about 0.915 g/ml, and a heat of fusion of about 65 J/g to about 125 J/g.

5. The composition of claim 1, wherein the propylene-based elastomer is a copolymer of ethylene and propylene.

6. The composition of claim 1, wherein the homogeneous ethylene-alpha olefin interpolymer is a copolymer of ethylene and hexene.

7. The composition of claim 1, wherein the weight ratio of the propylene-based elastomer to the homogeneous ethylene-alpha olefin interpolymer is about 40:60 to about 60:40.

8. The composition of claim 7, wherein the weight ratio of the propylene-based elastomer to the homogeneous ethylene-alpha olefin interpolymer is about 50:50.

9. The composition of claim 1, wherein the recycled/reprocessed polypropylene has a notched IZOD impact strength of about 0.125 ft·lbs/in to about 0.350 ft·lbs/in.

10. The composition of claim 9, wherein the notched MOD impact strength is about 0.150 ft·lbs/in to about 0.275 ft·lbs/in.

11. The composition of claim 1, wherein the recycled/reprocessed polypropylene has a tensile modulus of about 1230 MPa to about 2090 MPa.

12. The composition of claim 11, wherein the tensile modulus is about 1370 MPa to about 1960 MPa.

13. The composition of claim 1, wherein the recycled/reprocessed polypropylene has a strain at yield of about 6% to about 10%.

14. The composition of claim 13, wherein the strain at yield is about 7% to about 9%.

15. The composition of claim 1, wherein the recycled/reprocessed polypropylene has a stress at yield of about 38 MPa to about 47 MPa.

16. The composition of claim 15, wherein the stress at yield is about 40 MPa to about 45 MPa.

17. The composition of claim 1, wherein the recycled/reprocessed polypropylene has a melt flow rate index is about 10 g/10 min to about 18 g/10 min.

18. The composition of claim 17, wherein the melt flow rate index is about 12 g/10 min to about 16 g/10 min.

* * * * *